Patented Apr. 25, 1944

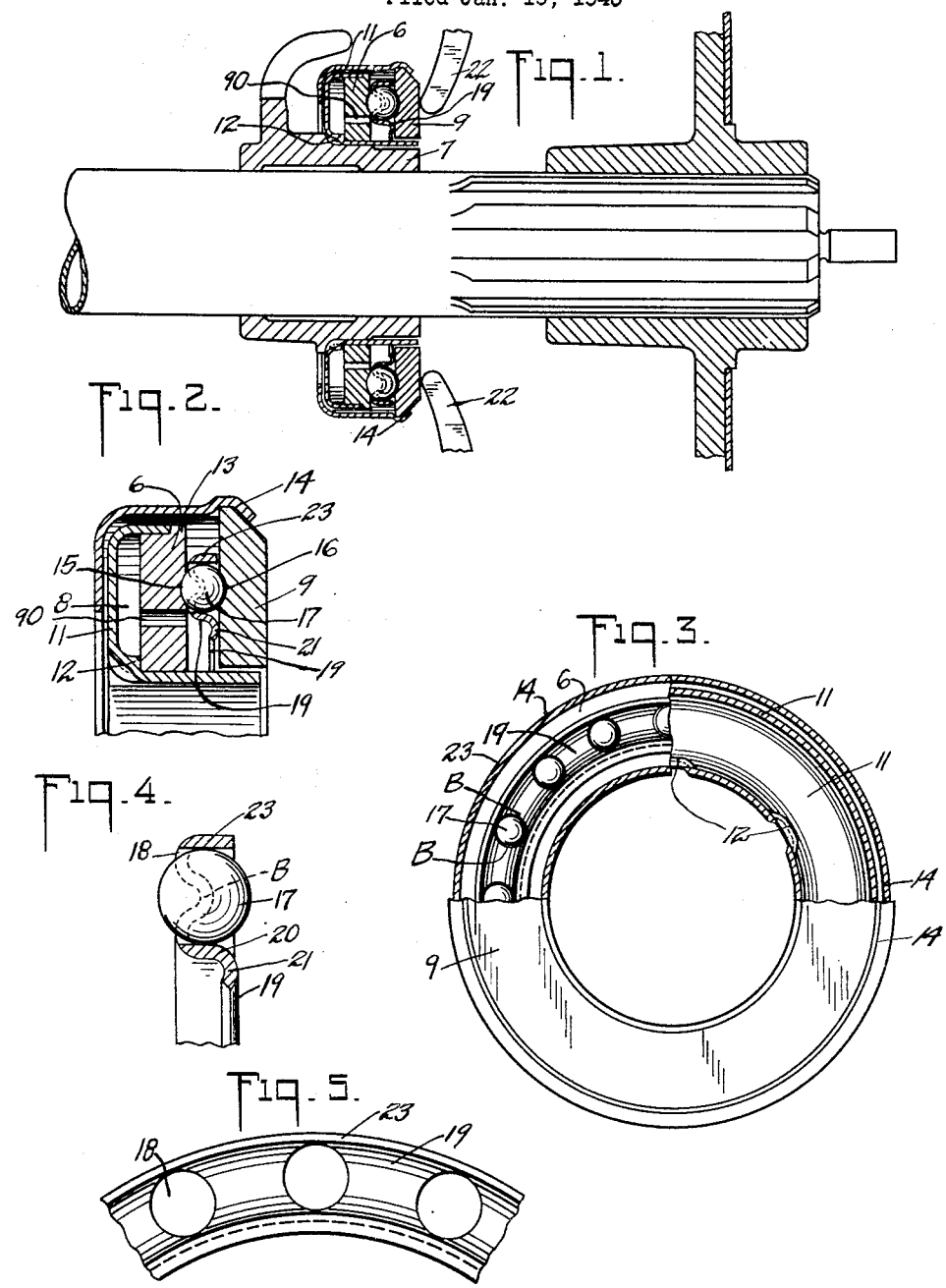

2,347,483

UNITED STATES PATENT OFFICE 2,347,483

THRUST BALL BEARING

Morris Katcher, New York, N. Y.

Application January 19, 1943, Serial No. 472,807

5 Claims. (Cl. 308—233)

This invention relates to ball bearings, and more particularly to those thrust ball bearings which are used as the clutch release bearing of an automobile motor or the like.

It is an object of the present invention so to construct the retainer ring for the balls, that their tendency to wedge between the ring and the races is eliminated and that said ring suffers a minimum of wear against radially outward thrust of the balls. When the clutch release levers or fingers are not pressing on the free race ring, or have very little pressure thereon, which is the condition when the clutch is engaged, the free race ring tends to separate from the fixed race ring under the outward force exerted by the balls should they be rotating. The free race ring, the balls and the retainer ring are caused to rotate by the clutch fingers when the clutch is disengaged and their momentum keeps them rotating a while after the clutch is engaged. Under the outward force of their rotation, the balls tend to leave their race grooves and exert pressure radially against an edge of their holes in the retaining ring. Where this edge is only the thickness of the sheet metal forming the retainer ring, and the web of said ring is inclined, as in my Patent No. 2,274,419, excessive wear results and the balls tend to wedge between the web of the retainer ring and the race rings. In the present invention, the retainer ring is so constructed that the balls instead of bearing against an edge press against a surface substantially at right angles to the race rings. Further, the retainer ring, instead of having oppositely disposed edges bearing against the balls circumferentially of said ring, said ring bears against the balls at a bend in its configuration, effecting substantially point contact, reducing drag against the rotation of the balls thereby. Further, the retainer ring is maintained axially in relation to the races with a minimum of wear by contacting the latter also at bends in its configuration at its radially inward portion.

Other objects and advantages will become apparent upon further study of the description and drawing, in which—

Fig. 1 is a vertical longitudinal or axial section of a typical automobile clutch release bearing modified to embody my invention.

Fig. 2 is a partial longitudinal section through the bearing to an enlarged scale.

Fig. 3 is a side elevation of the bearing with parts broken away to show the interior.

Fig. 4 is a longitudinal section, to an enlarged scale, through a portion of the retainer ring showing a ball held therein, and Fig. 5 is a side elevation, to an enlarged scale, of a portion of the retainer ring shown by itself.

The fixed race ring 6 has a tight fit in shell 11, the latter in turn being given a drive or tight fit on floating or sliding hub 7. Race ring 6 is driven back into shell 11 until its radially inward portion contacts teats 12 formed in the shell. The radially outward portion of the shell contacts shoulder 13 of ring 6. Between the rear of fixed race ring 6 and shell 11 is a reservoir 8 for holding lubricant, as more particularly described in my aforesaid patent, feed passages 90 being provided through ring 6 to the space between the race rings. Fixedly attached to free race ring 9, is outer shell 14, which has sufficient clearance to rotate over shell 11. Oppositely disposed race grooves 15 and 16 are provided respectively in race rings 6 and 9 in which balls 17 roll. Balls 17 are held in spaced relation circumferentially by being set in holes 18 of retainer ring 19 which is denoted as a whole by said latter numeral.

Retainer ring 19 is substantially M-shaped in cross section, the M being a shallow one with rounded corners. The radially inner flange or leg 20 of the M is provided with a rounded flange 21 curving radially inward and away from free race ring 9. Leg 20 has just sufficient clearance with race rings 6 and 9 to permit of relative rotation with said rings and yet to be in substantially fixed relation with them axially. In the drawing a sliding fit is shown between leg 20 and rings 6 and 9. This is also satisfactory.

It is to be noted that each ball 17 can contact retainer ring 19 at one point B on each side along a circle drawn through the center of holes 18. This is due to the reentrant curvature of the retainer ring so that its contact with a ball takes place at the mid-point of the M. Actual contact takes place only at one point B for each ball, said point being on the side of the ball where it pushes around the retainer ring, the balls in turn being dragged around by free race ring 9 when pressed against by rotating clutch fingers 22. Because of the point contact, the drag against the rotation of the balls is kept to a minimum. Why and how clutch fingers 22 are rotated and caused to press against race ring 9 are well known to those skilled in the automobile clutch art.

Even when fingers 22 are not pressing against race ring 9, its residual momentum will cause it to spin for awhile as a result of the last pressing. Under these conditions balls 17 rotate. Their rotation tends to throw them radially outward, and because of lack of pressure of fingers 22 against race ring 9, the outward force of the balls causes said ring to separate or move axially away from race ring 6. The balls 17, then partially leave their race grooves 15 and 16 and press against radially outer leg or flange 23 of the retainer ring. Because this pressure is against a surface, wear is kept to a minimum and because this surface extends axially and normal or at right angles to the line of pressure there is no tendency for a ball to wedge between the retainer ring and a race ring.

I claim:

1. A bearing comprising a pair of race rings, balls adapted to roll between the race rings holding them in axially spaced relation, and a retainer ring substantially M-shaped in cross-section, the outer leg of the M being an axially extending flange, and the inner leg being also an axially extending flange, the web of the retainer ring being trough shaped and extending radially between said flanges, the balls being set in circumferentially spaced holes in said web, the end of the inner leg at its junction with the web being rounded and the free end of the inner leg being turned back on itself to present a rounded face to its adjacent race ring, said inner leg acting as a spacer for the retainer ring between the race rings.

2. A thrust ball bearing comprising a free race ring, a fixed race ring, balls adapted to roll between the race rings holding them in axially spaced relation, an outer axially extending shell fixed to the free race ring, and an inner shell having an axially extending outer leg, an axially extending inner leg and a radially extending web between said legs, the fixed race ring having a tight fit over said inner leg being set back thereon into contact with teats formed therein at a substantial distance forward of said web, the outer leg of the inner shell being in tight contact with the fixed race ring, a lubricant reservoir being provided in the inner shell between the rear of the fixed race ring and said web, one or more axially extending feed passages being provided through the fixed race ring from the reservoir to the space between the race rings.

3. A ball bearing comprising a pair of race rings, balls adapted to roll between the race rings holding them in spaced relation, a shell in which one of the race rings is fixedly mounted, said shell having a pair of legs engaging opposite sides of the latter race ring and a web extending between said legs, one leg of the shell having teats formed therein extending inward and located at a substantial distance away from the web, the latter race ring being set back in the shell into contact with the teats, a lubricant reservoir being thereby provided in the shell between the web and the latter race ring, one or more feed passages being provided in said latter race ring between the reservoir and the space between the race rings.

4. A thrust ball bearing comprising a free race ring, a fixed race ring, balls adapted to roll between the race rings holding them in axially spaced relation, a shell in which the fixed race ring is fixedly mounted, said shell having an axially extending outer leg in tight contact with the outside of the latter race ring, an axially extending inner leg and a radially extending web between said legs, the fixed race ring having a tight fit over said inner leg, being set back thereon into contact with teats formed therein at a substantial distance forward of said web, a lubricant reservoir being provided in the inner shell between the rear of the fixed race ring and said web, one or more axially extending feed passages being provided through the fixed race ring from the reservoir to the space between the race rings.

5. A ball bearing comprising a pair of race rings, balls adapted to roll between the race rings holding them in spaced relation, an annular shell substantially U-shaped in cross section in which one of the race rings is fixedly mounted, the legs of the U engaging opposite sides of the latter race ring, one leg of the U having teats formed therein extending inward and located a substantial distance away from the back of the U, said latter race ring being set back in the shell into contact with the teats, a lubricant reservoir being thereby provided in the shell back of said latter race ring, said bearing being provided with one or more feed passages leading from the reservoir to the space between the race rings.

MORRIS KATCHER.